United States Patent

Vanderpool

[11] 4,080,685
[45] Mar. 28, 1978

[54] HEADLIGHT CLEANING SYSTEM

[76] Inventor: Charles C. Vanderpool, R.D. No. 1, Waverly, N.Y. 14892

[21] Appl. No.: 726,804

[22] Filed: Sep. 27, 1976

[51] Int. Cl.² ............................ B60S 1/44; B60S 1/46
[52] U.S. Cl. ............................... 15/250.01; 15/250.1; 15/250 A; 362/61
[58] Field of Search .......................... 15/250.01–250.04, 15/250.1, 250 A; 240/41.6, 46.05, 7.1

[56] References Cited

U.S. PATENT DOCUMENTS

| | | | |
|---|---|---|---|
| 2,557,872 | 6/1951 | Holland | 240/7.1 H |
| 3,310,669 | 3/1967 | Dils | 240/7.1 R |
| 3,441,729 | 4/1969 | Morgan | 240/46.05 X |
| 3,612,647 | 10/1971 | Lapraire | 15/250.1 X |
| 3,659,307 | 5/1972 | Vitou | 15/250.01 |

FOREIGN PATENT DOCUMENTS

| | | | |
|---|---|---|---|
| 1,907,202 | 9/1970 | Germany | 15/250 A |
| 1,907,602 | 11/1970 | Germany | 15/250.1 |
| 1,075,737 | 7/1967 | United Kingdom | 15/250.1 |

Primary Examiner—Peter Feldman
Attorney, Agent, or Firm—Charles S. McGuire

[57] ABSTRACT

An automatic headlight cleaning system wherein a transparent cylinder encircles the headlamps and is selectively rotatable about an axis to be cleaned by a stationary wiper element positioned out of the light path. The transparent cylinder is closed at one end by an integral end wall, and the other end is closed by a separate wall element fixed to the housing within which all the elements are mounted. The headlamp wiring extends through the fixed end wall, and an O-ring seals the annular space between the fixed end wall and the transparent cylinder. Means are provided for applying a cleansing liquid to the external surface of the cylinder by a forced spray and a rotating brush scrubs the external surface of the cylinder in advance of the wiper element. Drive means are provided for selectively rotating the cylinder and brush to position a clean section of the cylinder in the path of the beam.

10 Claims, 7 Drawing Figures

HEADLIGHT CLEANING SYSTEM

BACKGROUND OF THE INVENTION

The present invention relates to means for cleaning foreign matter from the beam path of automobile headlights and, more particularly, to systems of this type wherein the headlamps are encircled by transparent elements movable relative thereto.

U.S. Pat. No. 3,659,307 discloses generally an automobile headlight cleaning system wherein a tubular, transparent member encircles the lamp, whereby the beam is directed through the transparent member, the forwardly directed external surface of which is exposed to any foreign matter in its path. That is, the headlamp lenses are shielded from snow, rain, mud, insects, etc., by the encircling transparent member about the headlamp and for simultaneously rotating one or more brushes in contact with the external surface of the member in a position out of the path of the beam. Means may also be provided for directing a cleaning liquid upon the external surface which is thus cleaned as it rotates about the headlamp.

It is a principal object of the present invention to provide a headlight cleaning system of the above described type wherein improved light transmission through the transparent member is achieved.

Another object is to provide a headlight cleaning system wherein the headlamps are encircled by a rotatable transparent member and the mounting means facilitate fast and simple adjustment of the lamp beams.

Still another object is to provide headlamp cleaning apparatus constructed and arranged for reversible mounting on either side of the automobile.

In a more general sense, the object is to provide a novel and improved automobile headlight cleaning system.

Other objects will in part be obvious and will in part appear hereinafter.

SUMMARY OF THE INVENTION

The headlight cleaning system includes support means adapted to hold either a single or double standard automobile headlamp assembly, complete with lenses, rims and wiring. The support means provides for adjustment of the lamp beam axis in the usual manner and is mounted within a rigid housing which fits in a suitable space on the front of the vehicle.

A transparent cylinder encircles the headlamp assembly and its support means, whereby the light beam is directed through the cylinder. A stationary wiper element, preferably a strip of rubber or other resilient material, extends along the length of the cylinder, in continuous contact with a line parallel to its axis along the external surface thereof, at a position out of the path of the light beam. Means are provided for directing water or other cleaning liquid upon the outside surface of the cylinder as it rotates, and a rotatable cleaning element also effects a scrubbing action. Drive means are selectively actuable to rotate the cylinder which is thus scrubbed and wiped substantially clean and dry by the stationary wiper.

The transparent cylinder is preferably closed at one end by an integral end wall having a central opening for a pivot shaft. The other end of the cylinder is open and is mounted over a plate fixed to the housing means, a resilient O-ring sealing the annular space between the plate periphery and the inside surface of the cylinder, with a second O-ring providing a seal between the other end of the cylinder and the pivot shaft extending therethrough. Electrical wiring for the headlamps passes through an opening in the stationary end plate. The housing means for the unit is preferably hingedly connected to the automobile for movement to a position providing easy access to the transparent member for fast removal and replacement thereof. The lamp beams may be adjusted in the usual manner with the transparent cylinder removed.

DETAILED DESCRIPTION

Automobile 10 is equipped with a battery powered headlight system of the conventional type found in any modern automobile. For purposes of the present discussion, it is assumed that both the right and left headlight assemblies 12 and 14 include two, side-by-side lamps, although it will be understood that the cleaning system of the invention may be modified to incorporate various sizes, numbers and orientations of headlamps. The headlamps on each side are encircled by transparent cylinders, of glass, plastic, or the like, with their axes horizontally disposed. A portion of the external surfaces of cylinders 16 and 18 are exposed at the front of the vehicle, as seen in FIG. 1, the headlamps being positioned behind these forwardly directed portions of the cylinders, to direct their beams therethrough.

Figure 1:
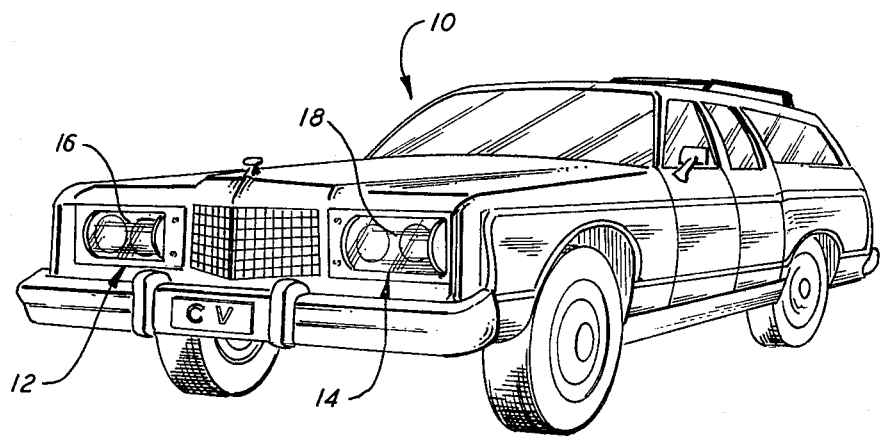
FIG. 1 is a perspective view of a typical automobile with the headlight cleaning system of the present invention incorporated therein.
Figure 2:
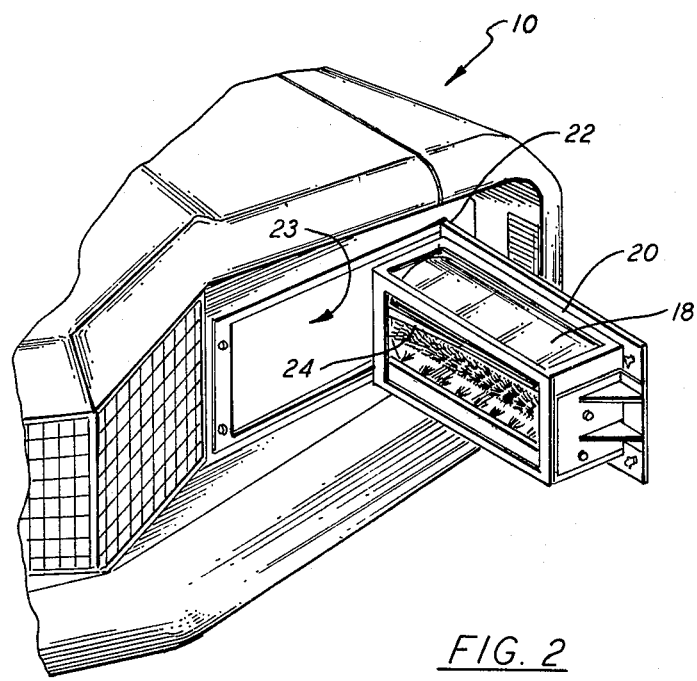
FIG. 2 is a fragmentary, perspective view of a portion of the automobile of FIG. 1 with the headlight housing in the opened position.

As shown in FIG. 2, the entire headlight and cleaning system assemblies are contained within housings which, in the illustrated construction, are hingedly connected to the front of the vehicle for movement between the normal operating position of FIG. 1, and the opened position of FIG. 2 for physical access to the internal parts thereof. The left housing 20 is shown in FIG. 2, movable about a suitable hinged connection at 22 for movement to the illustrated position, outside cavity 23 in the forward wall of automobile 10. Upper and rear portions of cylinder 18 are also seen in FIG. 2, with wiper element 24 engaging the rearwardly directed surfaces of the cylinder along its entire width.

Figure 3:
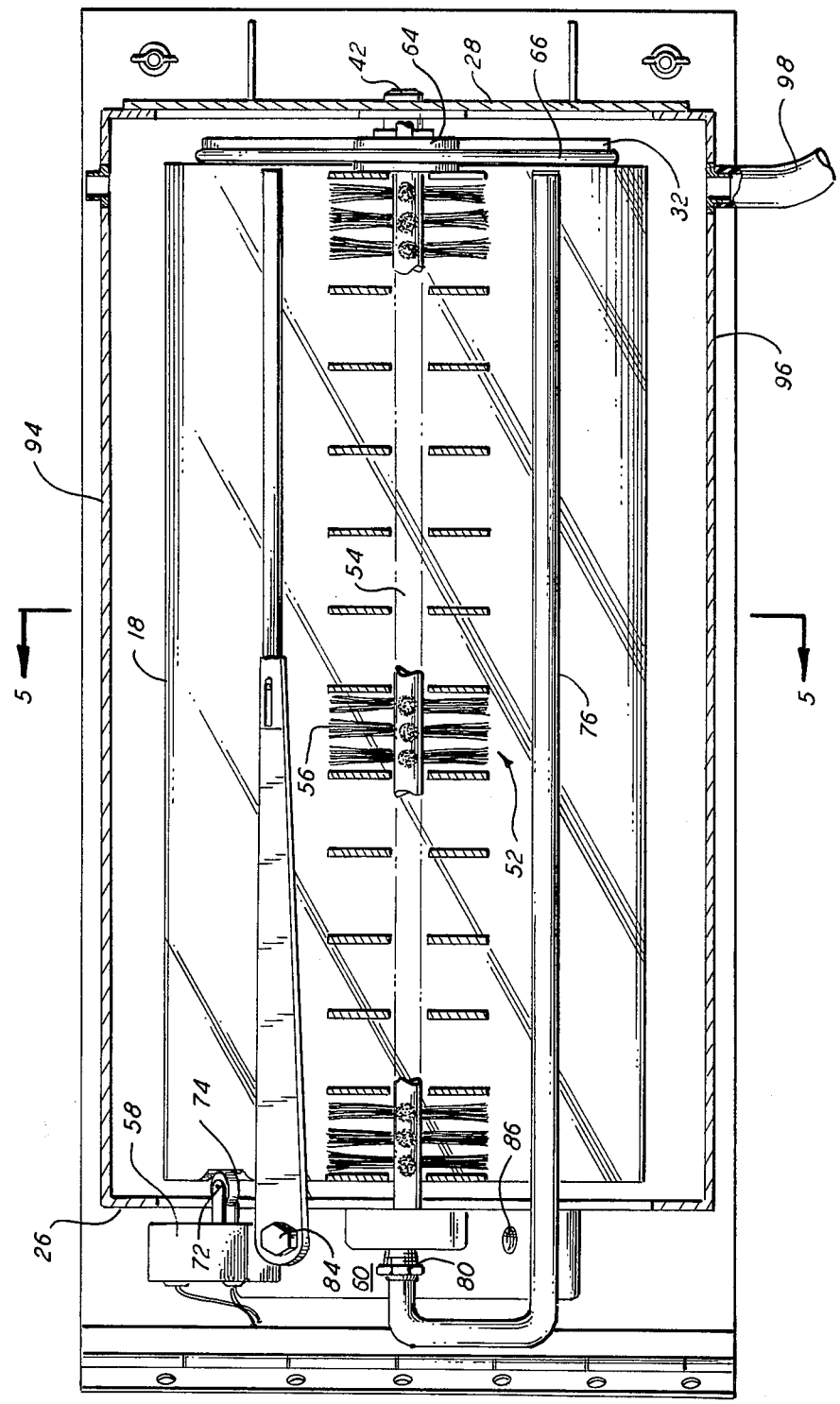
FIG. 3 is a rear elevational view of one embodiment of the headlight cleaning system.
Figure 4:
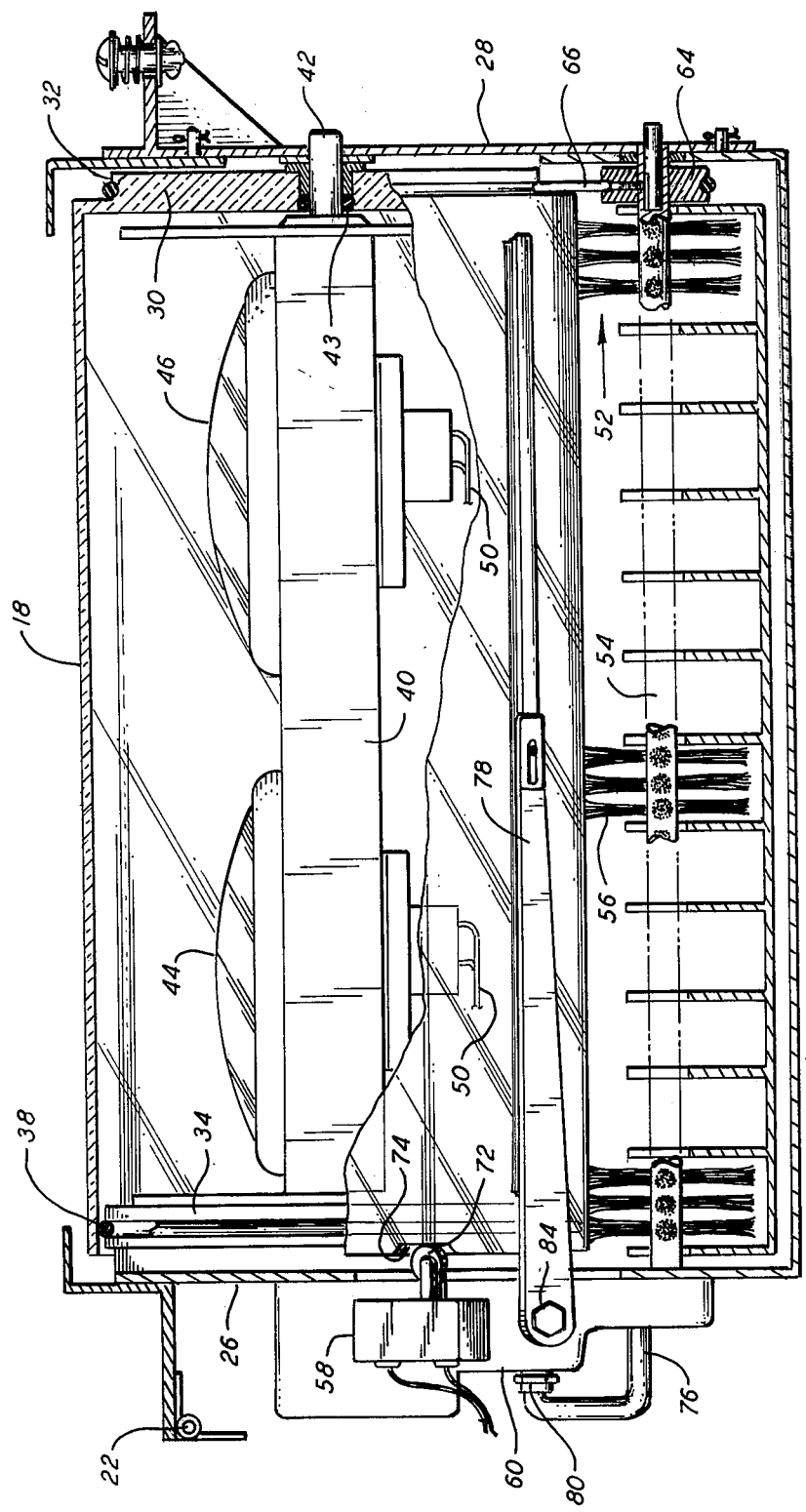
FIG. 4 is a top plan view partially in horizontal section through the center.

Turning now to FIGS. 3 and 4, housing 20 includes well members 26 and 28. Cylinder 18 is formed with one integral end wall 30, having a pulley surface 32 thereon, and the other end open. Circular end plate 34 is fixedly attached to wall 26 of housing 20, and extends into the open end of cylinder 18. End plate 34 is of slightly smaller diameter than the internal diameter of cylinder 18, the annular spaced between the two being sealed by resilient O-ring 38.

Suitably affixed to end plate 34 are headlamp support means 40. Extending from the end of support means 40 opposite end plate 34 is stub shaft 42 which passes through openings in cylinder end wall 30 and wall member 28. The annular space between shaft 42 and the opening in end wall 30 is filled by O-ring 43. Thus, cylinder 18 is sealed by, and mounted for rotation about its longitudinal axis upon O-rings 38 and 43. Headlamp units 44 and 46, conventional in all respects, are mounted on support means 40 for adjustment of beam angularity in the usual manner, i.e., by means of the usual adjusting screws. Electrical wiring 50, for connecting the lamps to the battery, extends through a sealed opening in end plate 34.

Figure 5:
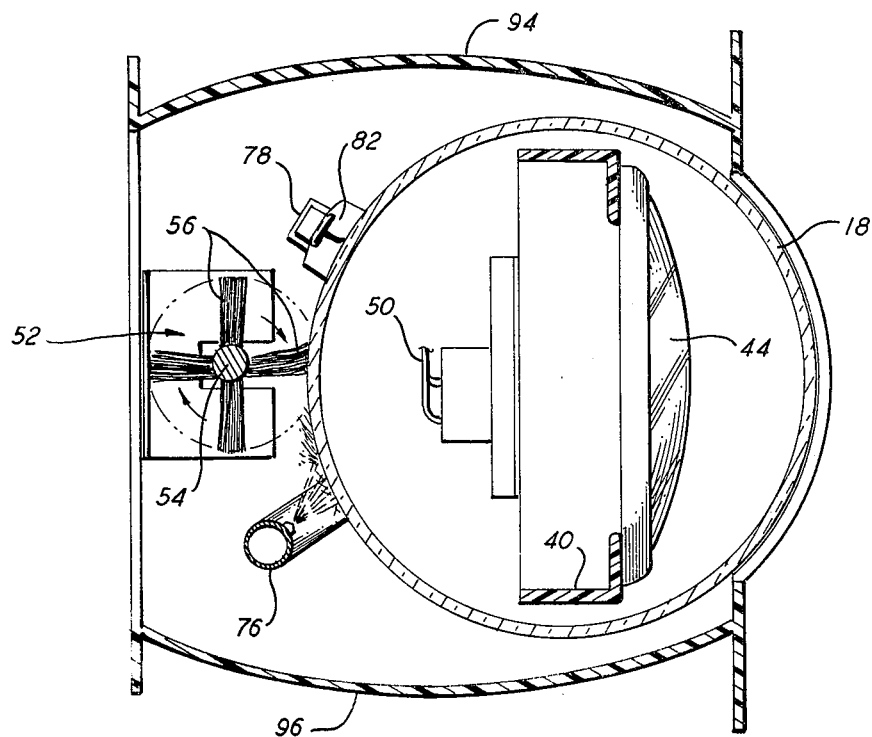
FIG. 5 is a side elevational view in section on the line 5—5 of FIG. 3.

An elongated, circular cross-section scrubbing member 52 is rotatably mounted adjacent cylinder 18. In the embodiment of FIGS. 3–5 member 52 comprises a brush having central shaft 54 with radially extending bristles 56 which engage the external surface of cylinder 18. Scrubbing member 52 is located behind cylinder 18, i.e., on the side opposite that through which the headlamp beam projects, and on a horizontal plane through the cylinder axis. Electric motor 58 is mounted on wall member 26 and the output thereof is reduced through gearing in casing 60 to the desired speed, and attached to shaft 54 to effect rotation of scrubbing member 52. Pulley 64 is affixed to shaft 54 at the end opposite the motor connection. Belt 66 passes around pulley 64 and around pulley surface 32, thereby transmitting rotation of scrubbing member 52 to cylinder 18. Due to the difference in diameter of the pulleys, the scrubbing member will rotate at a much faster rate than cylinder 18.

Spring biased contact member 72 extends through an opening in wall member 26 to engage the edge of cylinder 18 at the open end thereof. One or more indentations 74 are provided in this edge of the cylinder to allow contact member 72 to extend far enough to break the electrical contacts to which it is attached. Motor 62 is actuated to begin rotation of brush 52 and cylinder 18 by the operator of the automobile through a push-button switch, or other convenient actuating means (not shown). Upon initial movement of the edge of cylinder 18 engages contact member 72, causing the switch contacts to complete the circuit to motor 62 before the operator releases the manual switch. Thus scrubbing member and cylinder continue to rotate until contact member 72 enters another indentation 74 in the edge of the cylinder, when rotation stops until again actuated by the driver. If desired, selectively actuable relay means, or the like, may be provided to allow continuous rotation until manually turned off.

Also positioned adjacent the rear side (i.e., the side opposite that through which the headlamp beams project) are jet spray tube 76 and wiper element 78. Tube 76 is connected at end 80 to a reservoir of cleaning liquid which is forced by a pump (not shown) through holes in tube 76 to impinge upon the outside surface of cylinder 18 below scrubbing element 52. The same reservoir and pump used for the automobile windshield washers may be used to supply the cleaning liquid through tube 76, if desired.

Wiper element 78 is in the nature of a conventional windshield wiper, in the illustrated construction, including a support arm and wiper blade 82 of rubber, or other suitable material. Blade 82 contacts the outer surface of cylinder 18 along substantially its entire length on a line parallel to its axis. Wiper element 78 is stationary and positioned above scrubbing element 52 whereby, as cylinder 18 is rotated in a clockwise direction as seen in FIG. 5, the outer surface thereof is first contacted by the spray from tube 76, then by scrubbing element 52 and lastly by wiper element 78, resulting in a clean, substantially dry outer surface of cylinder 18 for positioning in the path of the headlamp beams.

Wiper element 78 is fixedly attached to gear housing 60 by bolt 84 which extends into a threaded hole in the housing. A second threaded hole 86 (FIG. 3) is provided in the gear housing for optional mounting of wiper element 78 equal distances on either side of scubbing element 52. Also, spray tube 76 is mounted for pivotal movement about end 80 between the position shown in FIGS. 3 and 5, and a second position an equal distance on the opposite side of scrubbing element 52. Thus, by mounting spray tube 76 and wiper element 78 in their alternate positions, the entire unit may be turned end-for-end and used on the opposite side of the automobile. That is, with no mechanical alteration whatever, the disclosed unit may be used for both right and left headlamp assemblies. Motor 58 is of the reversible type, whereby positive and negative leads may be connected to opposite terminals of the motor to effect rotation of cylinder 18 in opposite directions on opposite sides of the vehicle.

Figure 6:
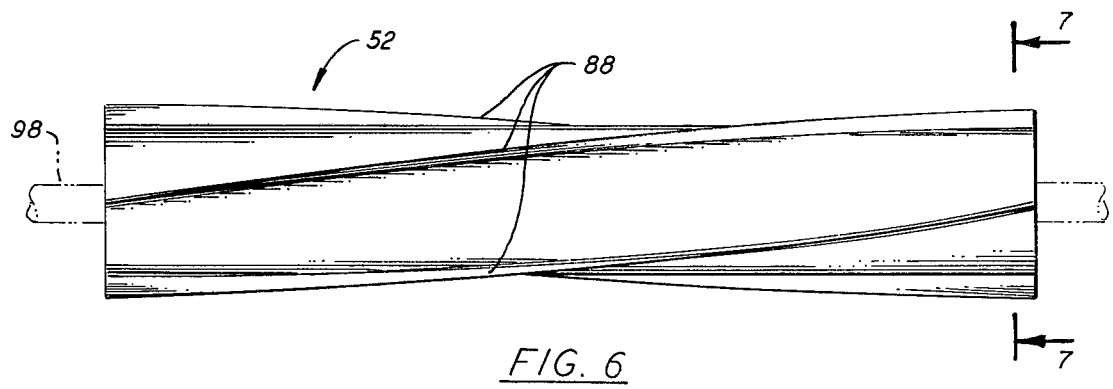
FIG. 6 is an elevational view of an alternate embodiment of one element of the system.
Figure 7:
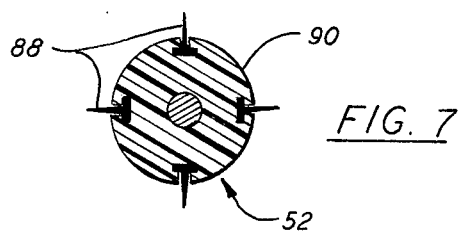
FIG. 7 is a sectional view on the line 7—7 of FIG. 6.

In FIGS. 6 and 7 is illustrated another embodiment of scrubbing element 52. Rather than being in the form of a brush with bristles, this construction includes a plurality of resilient scrubber blades 88, supported upon central core 90 along the length thereof. Preferably blades 88 are supported in channels, or by other such means allowing selective replacement thereof, in a generally spiral path. Shaft 92 is connected to the gearing within housing 60 to be rotated by motor 58.

Housing means 20 includes upper and lower walls 94 and 96, seen in FIGS. 3 and 5. After the cleaning liquid from tube 76 has been used to clean the outer surface of cylinder 18, and wiped therefrom by wiper element 78, it falls to lower wall 96 and is drained out of the housing and free of the automobile through drain tube 98 (FIG. 3).

The switch provided for manual actuation by the vehicle operator may be of the push-button type, spring biased toward the open position, in which case the manual switch need be actuated only momentarily with the switch connected to contact element 72 providing continued rotation until automatically stopped by entering notch or recess 74 in the edge of cylinder 18. Alternatively, the manual switch may be of the type which may be locked in the closed position to provide continuous rotation of motor 58 and cylinder 18 until manually turned off. In the event selective actuation in either momentary or locked modes is provided, it may be desirable to actuate the pump providing liquid through tube 76 in only the momentary mode. That is, continuous rotation is most desirable when operating under conditions of heavy rain or snow, where only the precipitation reduces the intensity of the beam visible to the operator. In such cases, the action only of wiper element 78 will serve to remove much of the obstruction from the beam path.

What is claimed is:

1. A cleaning system for removing matter obscuring the beam path of an automobile headlamp, said system comprising:
   (a) at least one electric headlamp supported at the front end of an automobile upon support means permitting selective adjustment of the angle of the headlamp beam relative to the automobile;

(b) a transparent, cylindrical member having a closed end and an open end encircling said headlamp and support means with the axis of the cylinder substantially perpendicular to the beam axis;

(c) a circular plate fixedly supported with respect to said headlamp and support means in covering relation to said open end of said cylindrical member;

(d) sealing means effecting a substantially moisture and dust impervious seal between said plate and said open end, said sealing means allowing rotation of said cylindrical member relative to said plate;

(d) powder-driven means for effecting selective rotation of said cylindrical member about its axis;

(e) washing means adapted to remove extraneous matter from the external surface of said cylindrical member during said selective rotation thereof; and (f) means for relatively mounting and connecting all of said headlamp and support means, cylindrical member, plate, sealing means, power-driven means and washing means to allow manual removal of said cylindrical member from encircling relation to said headlamp and support means for adjustment of said beam axis, and manual replacement of said cylindrical member in said encircling relation.

2. The invention according to claim 1 wherein said washing means includes means for directing a cleaning liquid upon said external surface and movable scrubbing means in contact with said external surface.

3. The invention according to claim 2 wherein said power-driven means is operatively connected to said scrubbing means to effect movement thereof as said cylindrical member is moved.

4. The invention according to claim 3 wherein said plate is of smaller diameter than the inside of said cylindrical member and extends into said open end, said sealing means comprising an O-ring engaging the external periphery of said plate and the internal surface of said cylindrical member adjacent said open end thereof.

5. The invention according to claim 4 wherein the electrical wiring for said headlamp extends through a sealed opening in said plate.

6. The invention according to claim 5 wherein said cylindrical member, plate, power-driven means and washing means are symmetrically constructed for mounting of the same unit, turned end-for-end, in both right and left positions on the front of an automobile.

7. The invention according to claim 1 and further including housing means substantially enclosing said cylindrical member, headlamp and support means, plate, power-driven means and washing means.

8. The invention according to claim 7 wherein said housing means is pivotally mounted for movement about an axis into and out of a cavity in the forward well of the automobile, said headlamp being in its normal operating position when said housing means is in said cavity and said cylindrical member is accessible for removal when said housing means is out of said cavity.

9. The invention according to claim 8 wherein said housing means includes a manually removable end wall, accessible from the front of the automobile when said housing means is moved out of said cavity, adjacent said closed end of said cylindrical member.

10. The invention according to claim 9 wherein said washing means includes means for directing a cleaning liquid upon the outer surface of said cylindrical member in a position remote from the beam path, and said housing means includes drain means through which said liquid is drained from said housing means.

* * * * *